United States Patent [19]

Petersen

[11] Patent Number: 5,678,984
[45] Date of Patent: Oct. 21, 1997

[54] DETACHABLE FOLDING TRAILER RAMP

[76] Inventor: Larry M. Petersen, 29395 170th Ave., Long Grove, Iowa 52756

[21] Appl. No.: 724,103

[22] Filed: Sep. 30, 1996

[51] Int. Cl.$^6$ ............................................. B65G 67/02
[52] U.S. Cl. ........................ 414/537; 14/71.7; 296/61
[58] Field of Search ..................... 414/537; 296/61; 14/71.7

[56] References Cited

U.S. PATENT DOCUMENTS

| | | |
|---|---|---|
| 2,441,710 | 5/1948 | Martin .................................. 414/537 |
| 3,307,719 | 3/1967 | Martin, Jr. . | 
| 3,441,153 | 4/1969 | Handley ............................... 414/537 |
| 3,516,560 | 6/1970 | Brighton . |
| 3,720,335 | 3/1973 | Ward . |
| 3,795,333 | 3/1974 | Tebben . |
| 3,834,565 | 9/1974 | Goodman et al. ...................... 296/61 |
| 4,144,979 | 3/1979 | Leach, Jr. et al. . |
| 4,372,727 | 2/1983 | Fredrickson et al. ................... 296/61 |
| 4,647,270 | 3/1987 | Maloney ............................... 414/537 |
| 5,035,565 | 7/1991 | White . |
| 5,342,105 | 8/1994 | Miles .................................... 296/61 |
| 5,393,192 | 2/1995 | Hall et al. . |

Primary Examiner—Thomas J. Brahan
Attorney, Agent, or Firm—Henderson & Sturm

[57] ABSTRACT

A ramp for flatbed trucks and trailers which may be attached or removed from the vehicle in a matter of seconds and requires no modification of the trailer. The invention utilizes two ramp sections which are pivotally secured together by a double piano hinge assembly and driven by a pair of hydraulic cylinders. A series of legs depending from the forward edge of the from ramp engage the sockets commonly found at the rear of a flatbed as the forward vertical framework of the ramp engages the trailer's rear safety bar for added stability and strength.

2 Claims, 6 Drawing Sheets

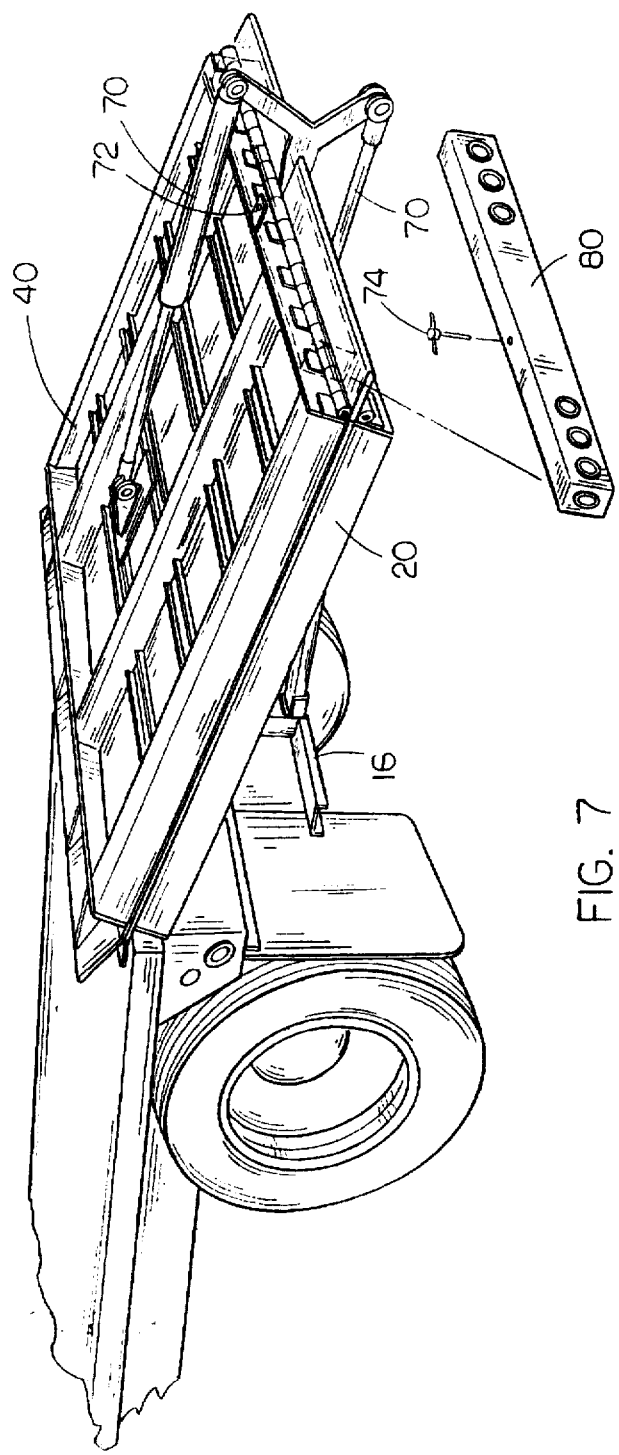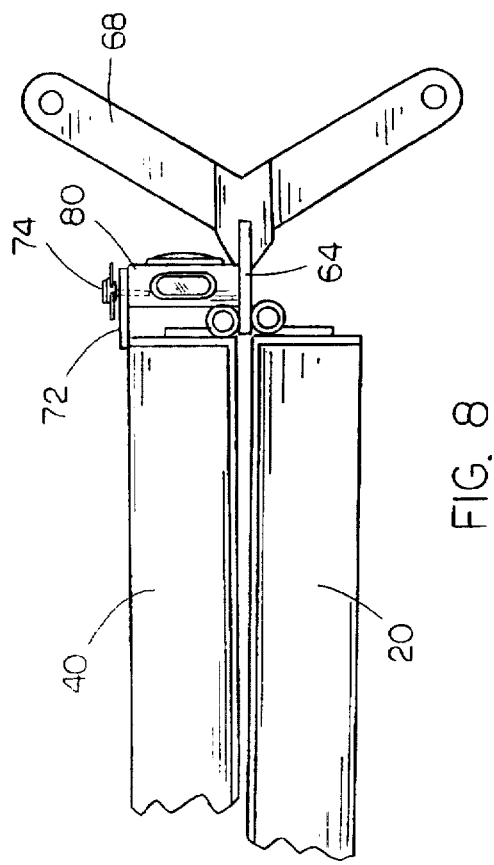

DETACHABLE FOLDING TRAILER RAMP

BACKGROUND OF THE INVENTION

Some sort of ramp is usually required when loading trucks or trailers, whether the load be animals, vehicles, containers to be loaded with forklifts, or most any other type of load. These ramps are most often not a part of the vehicle, but are rather available at the loading and unloading sites where they can be moved into position at the rear of the truck or trailer. However, some ramps have been developed which are pivotally attached to the rear of the trailer and can be moved between a lowered, loading position and a raised position during vehicle movement. These ramps are generally permanently secured to the trailer, although U.S. Pat. No. 4,144,979 discloses a detachable ramp for flatbed trailers which utilizes a fairly intricate mechanism for securing the ramp to the trailer.

BRIEF SUMMARY OF THE INVENTION

The present invention discloses a ramp for flatbed trucks and trailers which may be attached or removed in a matter of seconds and requires no modification of the vehicle. The invention utilizes two ramp sections which are pivotally secured together by a double piano hinge assembly and driven by a pair of hydraulic cylinders. A series of legs depending from the forward edge of the from ramp engage the sidewall sockets commonly found around the periphery of a flatbed while the forward vertical framework of the ramp engages the trailer's rear safety bar for added stability and strength.

BRIEF DESCRIPTION OF THE SEVERAL VIEWS OF THE DRAWING

These and other attributes of the invention will become more clear upon a thorough study of the following description of the best mode for carrying out the invention, particularly when reviewed in conjunction with the drawings, wherein:

FIG. 7 is a rear perspective view of the invention on the trailer and depicts the removable light bar;

FIG. 8 is a side elevational view of the double piano hinge assembly and the light bar.

DETAILED DESCRIPTION OF THE INVENTION

Figure 1:
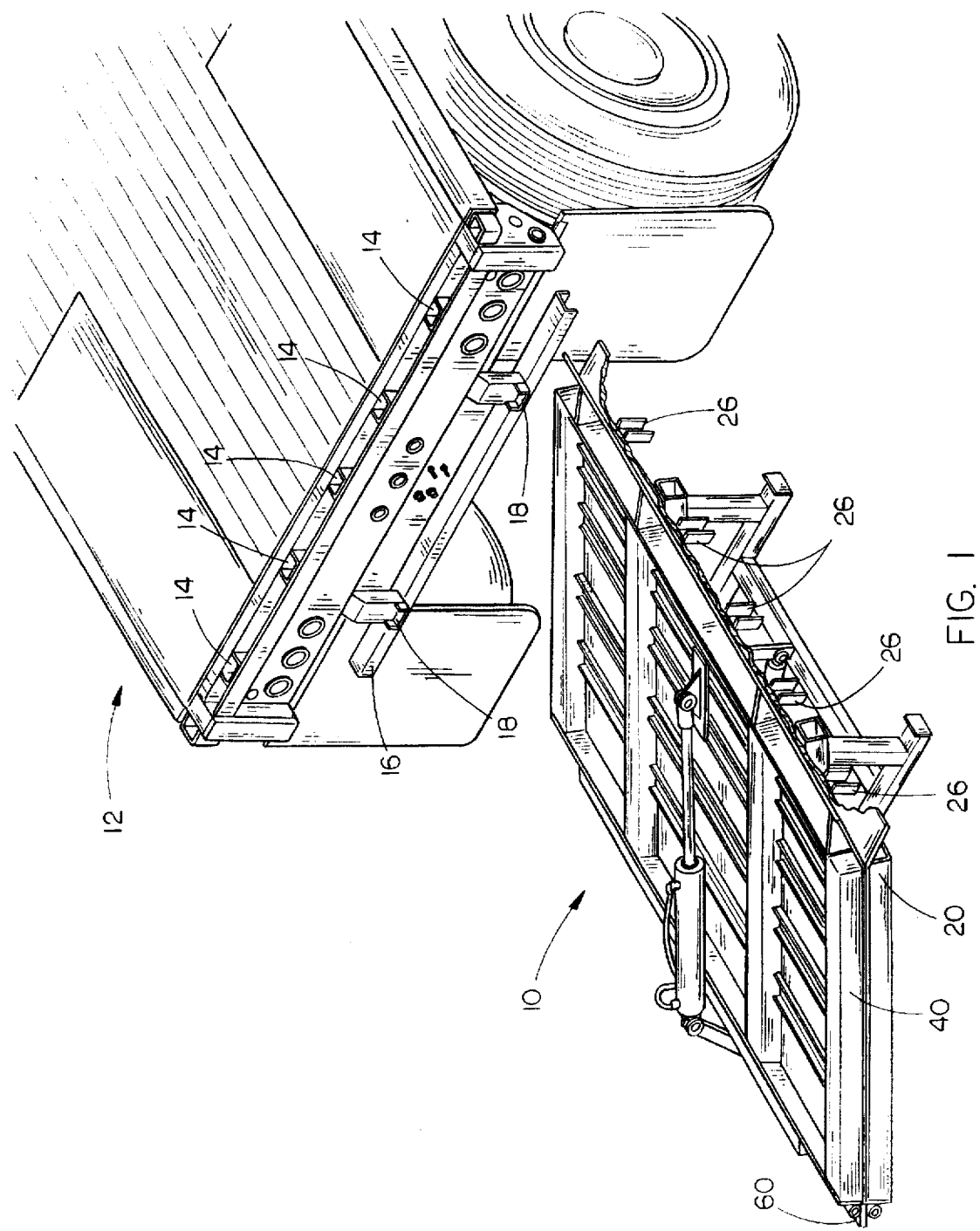
FIG. 1 is a front perspective view of the invention in the folded configuration and resting on the ground at the rear of a flatbed trailer, with the forward edge of the front ramp section partly cutaway to more clearly show the from ramp legs.

Referring now to the drawings, wherein like reference numerals designate identical or corresponding parts throughout the several views, the invention is depicted at (10) in FIG. 1 in the folded configuration resting on the ground behind a standard flat bed trailer (12). The trailer (12) has a series of sidewall sockets (14) situated across the rear end and also includes a safety bar (16) which extends below the trailer bed. The depicted safety bar (16) has been slightly modified by the addition of two cup-shaped members (18) for a purpose to be described shortly, although this modification is not absolutely necessary but does provide additional support to the ramp.

Figure 2:
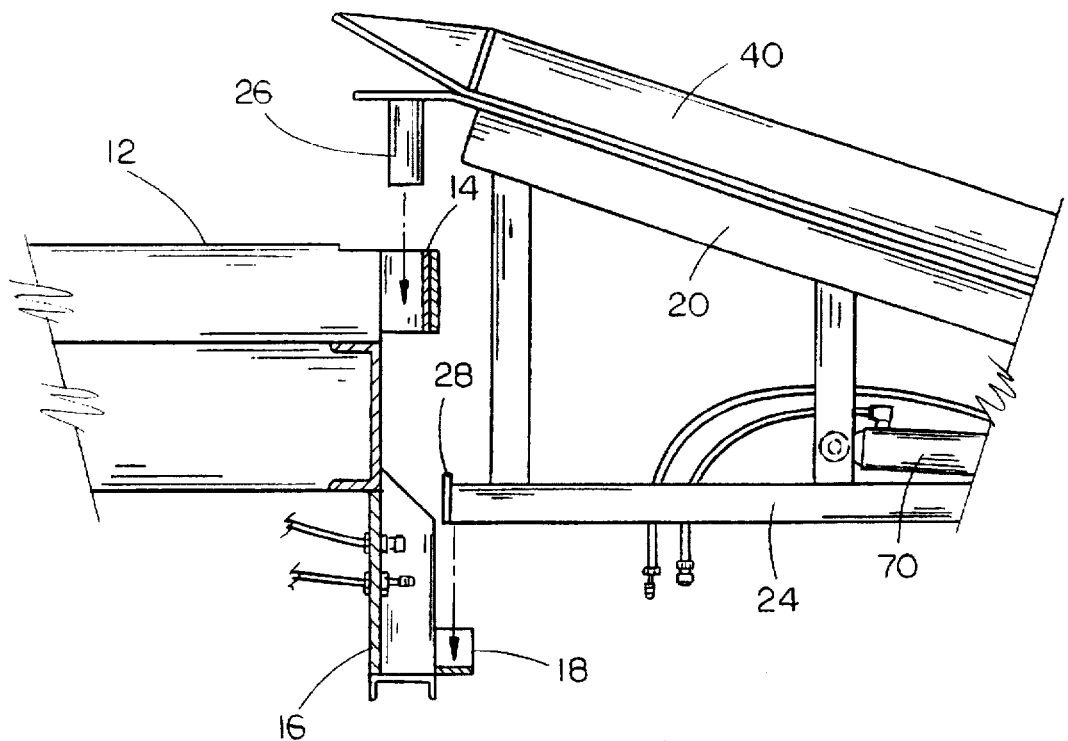
FIG. 2 is a close up, side elevational view of the invention just prior to being lowered into engagement with the trailer.
Figure 3:
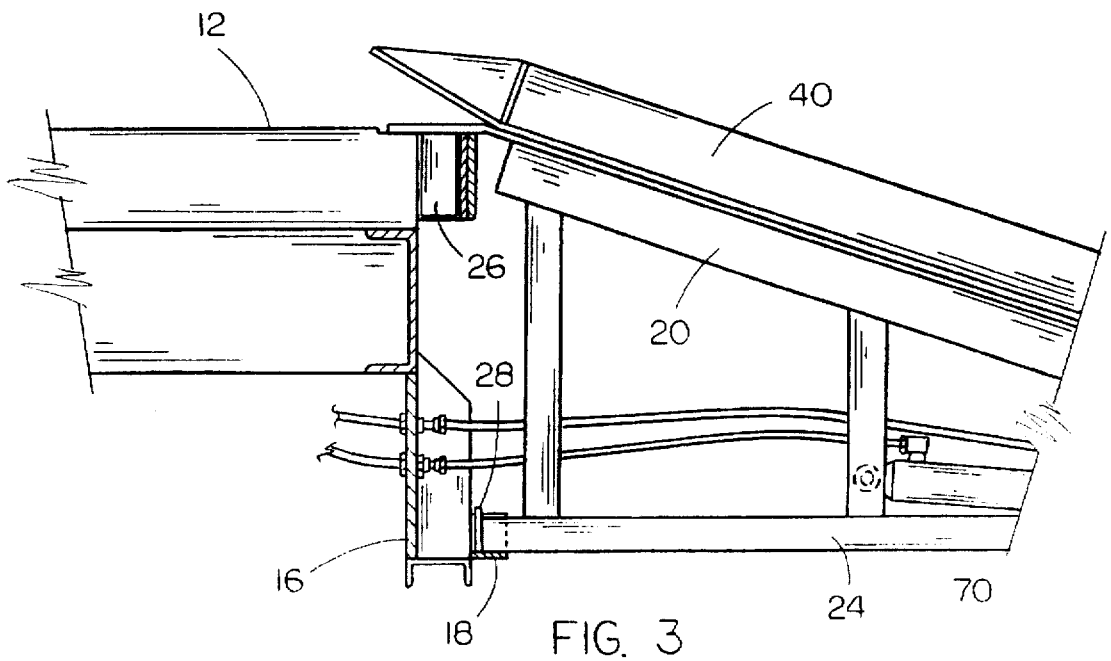
FIG. 3 is a close up, side elevational view of the invention engaged with the trailer.
Figure 4:
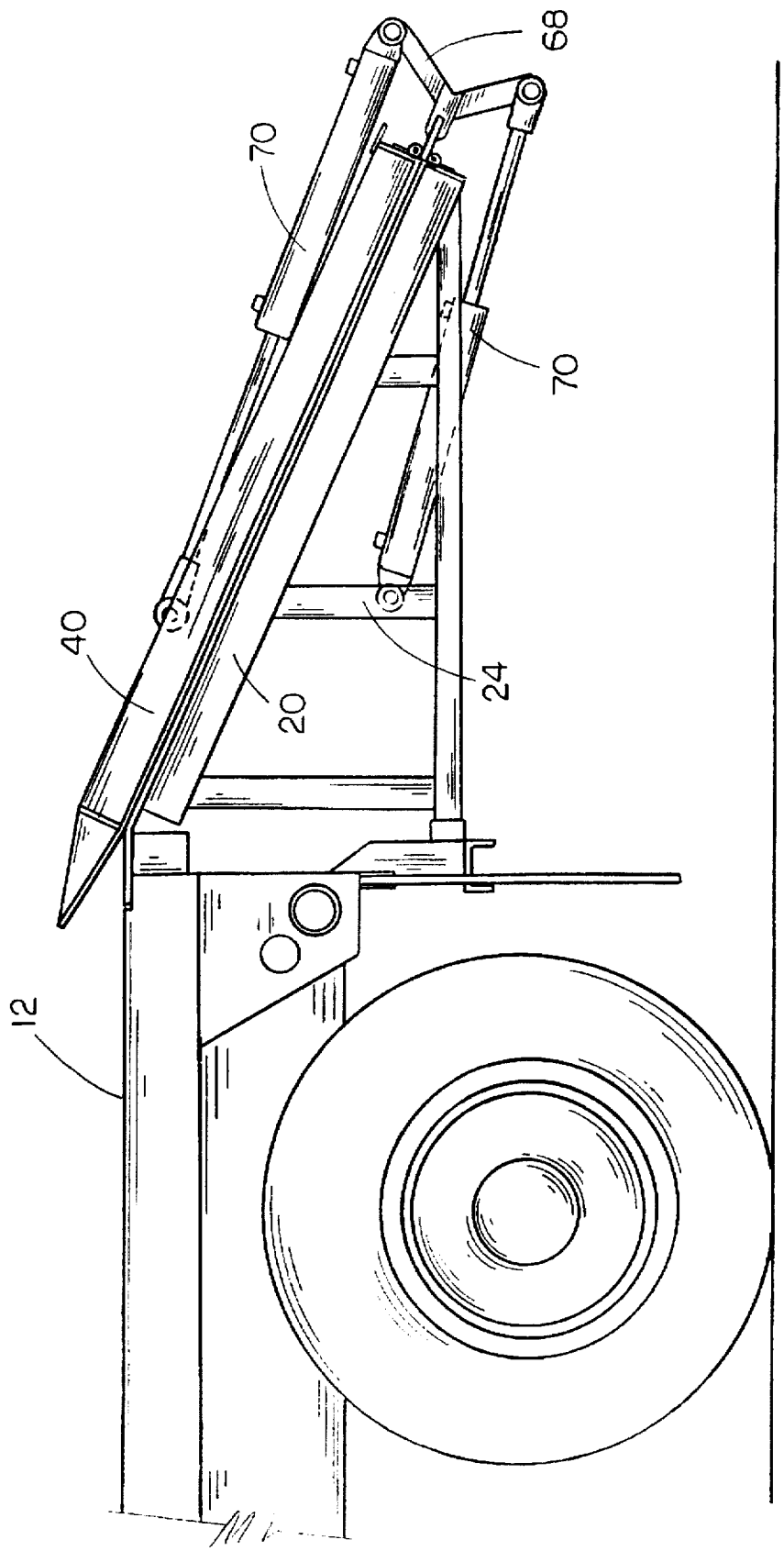
FIG. 4 is a side elevational view of the invention engaged with the trailer and in the folded configuration.

The ramp (10) is comprised of a front section (20) and a rear section (40) which are pivotally secured together by a double piano hinge assembly (60). The front section (20) has a deck (22) (FIGS. 5 and 6) welded to an angled support framework (24) and further includes five short legs (26) depending from the forward end of the from section (20). As seen in FIG. 2 and FIG. 3, these legs (26) engage the sidewall sockets (14) of the trailer (12) to attach the ramp (10) to the trailer (12). Further, two forward extensions (28) of the framework (24) engage the cup-shaped safety bar members (18) to provide further support for the ramp (10).

As is clearly depicted in FIGS. 1 and 7, the rear section (40) is structurally similar to the front section (20), but does not include the angled support framework (24).

Figure 9:
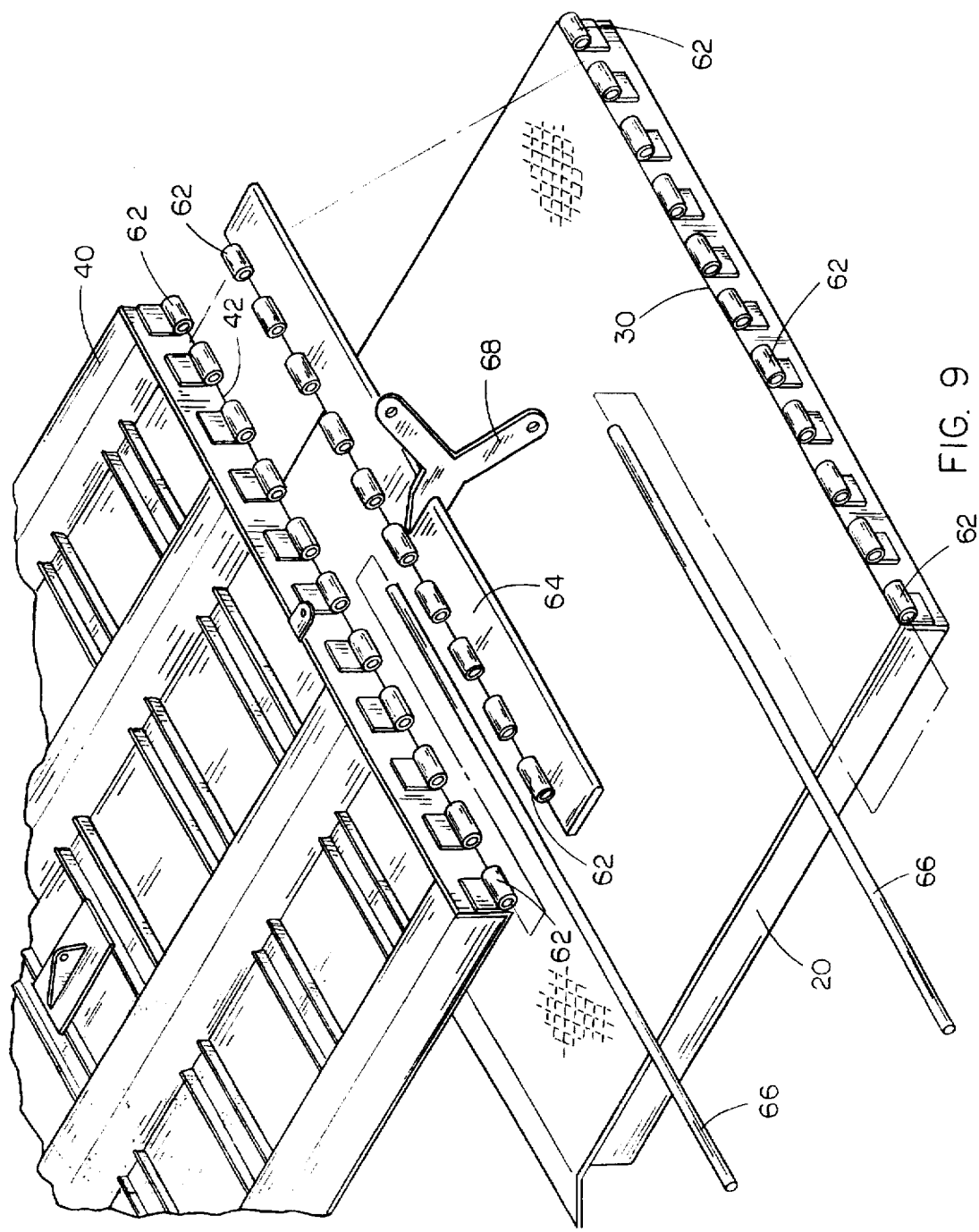
FIG. 9 is an exploded perspective view of the double piano hinge assembly.

Referring now to FIG. 9, the front section (20) is seen to have a series of hinge tubes (62) extending in a coaxial, spaced apart relationship across its upper, rearward edge (30). Likewise, the rear section (40) is seen to have an identical series of hinge tubes (62) extending in a coaxial, spaced apart relationship across its upper, forward edge (42). These hinge tubes (62) engage a complimentary set of hinge tubes (62) which extend both upwardly and downwardly from the edge of a pivot plate (64) by means of a pair of hinge pins (66). Welded to the opposite side of the pivot plate (64) is a Y-shaped pivot yolk (68). Each of the arms of the pivot yolk (68) are operatively connected to one end of a pair of hydraulic cylinders (70), which are in turn pivotally secured to the support framework of their respective sections. The hydraulic cylinders (70) may be operatively connected to the vehicle hydraulic system or may use an independent hydraulic power supply, as necessary.

Referring to FIGS. 7 and 8, the invention also includes a detachable light bar (80) which rides atop the pivot plate (64) when the invention is in the folded configuration and is held in place by means of a flange (72) with a small aperture in it for receipt of a lock pin (74). The light bar (80) is then electrically connected to the vehicle's lighting and braking systems.

Operation

Figure 5:
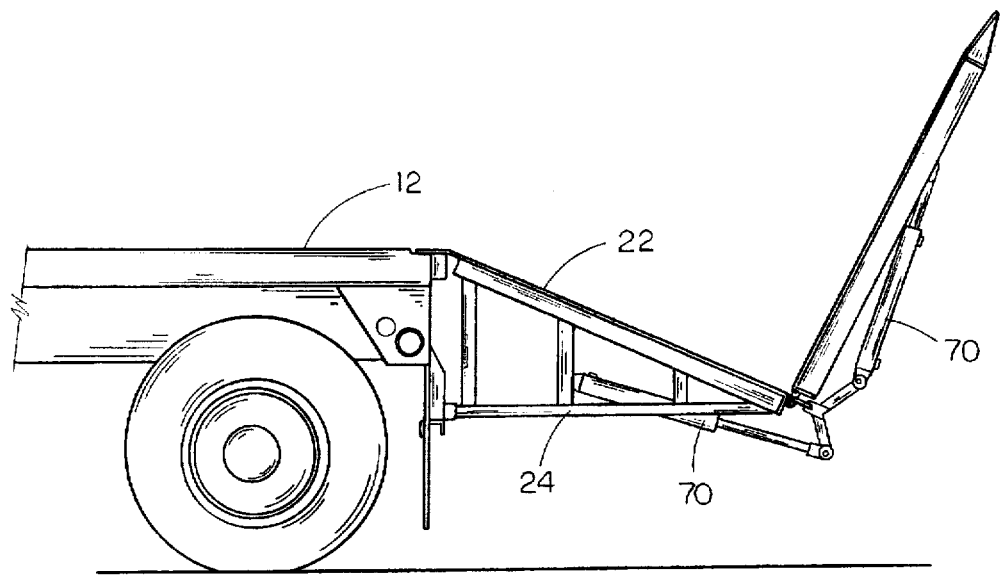
FIG. 5 is a side elevational view of the invention engaged with the trailer and in a partially extended configuration.
Figure 6:
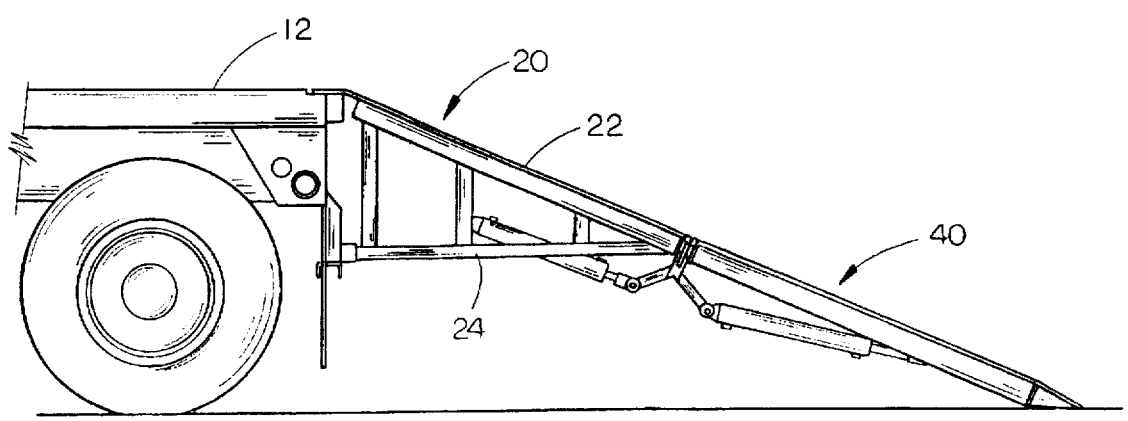
FIG. 6 is a side elevational view of the invention engaged with the trailer and in the fully extended position.

The invention (10) may be quickly and easily secured to the trailer (12) by means of a fork lift which positions the legs (26) of the front section (20) over the sidewall sockets (14) of the trailer and then lowers the invention into place. This action also engages the forward extensions (28) of the angled support framework (24) with the cup-shaped safety bar members (18). If the ramp is to be used for loading, the light bar (80) should be disconnected and removed and the hydraulic cylinders (70) must be secured to the available hydraulic system. When hydraulic power is supplied, the two cylinders (70) retract and the rear section (40) slowly rotates upward and rearwardly as seen in FIG. 5 until reaching the extended configuration of FIG. 6. To retract the ramp, the hydraulic power is reversed, causing the two hydraulic cylinders (70) to extend and slowly pivot the rear section (40) onto the front section (20). The light bar (80) is then be replaced on the pivot plate (64) and connected to the vehicle light and braking systems.

Although only one exemplary embodiment of this invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. A detachable ramp for trucks and trailers having a series of spaced apart sidewall sockets at the periphery thereof and having a safety bar depending from the rear thereof, comprising:

a from ramp section having a deck secured upon an angled support frame, said front ramp section having a plurality of spaced apart legs depending from a forward side thereof and having a plurality of spaced apart hinge tubes affixed along a rearward side thereof;

a rear ramp section having a deck secured upon a support frame, said rear ramp section having a plurality of spaced apart hinge tubes affixed along a forward side thereof;

a pivot plate have a plurality of hinge tubes affixed along both an upper and a lower surface thereof for pivotal engagement with said hinge tubes of said front and rear ramp sections, said pivot plate further having a pivot yolk secured thereto;

first and second hydraulic cylinders operably connected between said pivot yolk and said front and rear ramp sections respectively.

2. The detachable ramp as recited in claim 1 and further comprising a removable light bar for operable securement to the rear of said ramp when in a folded configuration.

* * * * *